(12) United States Patent
Rineer

(10) Patent No.: US 8,756,207 B2
(45) Date of Patent: Jun. 17, 2014

(54) SYSTEMS AND METHODS FOR IDENTIFYING POTENTIAL DUPLICATE ENTRIES IN A DATABASE

(75) Inventor: Brian Carl Rineer, Apex, NC (US)

(73) Assignee: SAS Institute Inc., Cary, NC (US)

( * ) Notice: Subject to any disclaimer, the term of this patent is extended or adjusted under 35 U.S.C. 154(b) by 19 days.

(21) Appl. No.: 13/299,781

(22) Filed: Nov. 18, 2011

(65) Prior Publication Data

US 2013/0132410 A1     May 23, 2013

(51) Int. Cl.
    *G06F 7/00*     (2006.01)
    *G06F 17/30*     (2006.01)

(52) U.S. Cl.
    CPC .... *G06F 17/30303* (2013.01); *G06F 17/30371* (2013.01); *G06F 17/30575* (2013.01); *G06F 17/30598* (2013.01)
    USPC .......................................... 707/692; 707/772

(58) Field of Classification Search
    CPC ................... G06F 17/30303; G06F 17/30575; G06F 17/30371; G06F 17/30598
    See application file for complete search history.

(56) References Cited

U.S. PATENT DOCUMENTS

| | | | |
|---|---|---|---|
| 181,527 A1 | 9/2004 | Burdick et al. | |
| 7,200,604 B2 * | 4/2007 | Forman et al. | 707/692 |
| 7,747,480 B1 * | 6/2010 | Agresta et al. | 705/28 |
| 2005/0084152 A1 * | 4/2005 | McPeake et al. | 382/173 |
| 2011/0055233 A1 * | 3/2011 | Weber et al. | 707/752 |

OTHER PUBLICATIONS

Raghunathan et al., "A Multi-Pass Sieve for Coreference Resolution", Proceeding of the 2010 Conference on Empirical Methods in Natural Language Processing, pp. 492-501, Oct. 2010, Association for Computational Linguistics.*
Minton et al., "A Heterogeneous Field Matching Method for Record Linkage", Proceedings of the Fifth IEEE International Conference on Data Mining, pp. 1-9, IEEE, 2005.*
Cohen et al., "Learning to match and cluster large high-dimenesional data sets for data integration", Proceedings of the Eighth ACM SIGMOD international conference on Knowledge discovery a nd data mining, pp. 475-480, ACM, 2002.*
Fan et al., "Interaction between record matching and data repairing", SIGMOD '11: Proceedings of the 2011 ACM SIGMOD International COnference on Management of Data, pp. 469-4802011, ACM.*
Chang et al., "A Signature Access Method for the Starburst Database System", Proceedings of the Fifteenth International Conference on Very Large Data Bases, pp. 145-154, 1989.*

* cited by examiner

*Primary Examiner* — Michael Hicks
(74) *Attorney, Agent, or Firm* — Kilpatrick Townsend & Stockton LLP

(57) ABSTRACT

In accordance with the teachings described herein, systems and methods are provided for identifying potential duplicate entries in a database. Matchcodes are generated for a plurality of records, wherein a matchcode for a record may be generated by: receiving a character string from the record; determining whether the character string includes a non-essential character substring; if the non-essential character substring is missing from the character string, then generating the matchcode from the character string and adding a wildcard character to the matchcode in place of the missing non-essential character substring. The matchcodes for the plurality of records may be compared to identify matching pairs of matchcodes, wherein for the purpose of identifying a matching pair of matchcodes, two characters are considered the same if they are equal or if one or both are wildcard characters.

41 Claims, 13 Drawing Sheets

| ID | DATA | MATCHCODE |
|---|---|---|
| 301 | ROBERT BRAUER | RBRT$BRWR$$$$$$ |
| 302 | ROBERT J BRAUER | RBRT$BRWR$$$$$$ |

Fig. 6A

| ID | DATA | MATCHCODE |
|---|---|---|
| 301 | ROBERT BRAUER | RBRT$BRWR$$$$$$ |
| 302 | ROBERT J BRAUER | RBRT$BRWR$$$$$$ |
| 303 | ROBERT L BRAUER | RBRT$BRWR$$$$$$ |

Fig. 6B

| ID | DATA | MATCHCODE |
|---|---|---|
| 301 | ROBERT BRAUER | RBRT$BRWR$$$?$$ |
| 302 | ROBERT J BRAUER | RBRT$BRWR$$$J$$ |
| 303 | ROBERT L BRAUER | RBRT$BRWR$$$L$$ |

SYSTEMS AND METHODS FOR IDENTIFYING POTENTIAL DUPLICATE ENTRIES IN A DATABASE

FIELD

The technology described in this patent document relates generally to database management. More particularly, systems and methods are described for identifying potential duplicate entries in a database.

BACKGROUND

A typical business requirement for a data management system is to identify potential duplicate entries in a database and, for each pair of potential duplicates, provide a score indicating the likelihood that the records do in fact represent the same entity. Known algorithms for identifying potential duplicate database entries include character-based difference-scoring algorithms (e.g., Jaro-Winkler, Levenshtein, etc.) and knowledge-based semantic comparisons. Regardless of which algorithm is selected, however, it is typically not feasible to directly compare every record in a database to every other record in the same database due to performance concerns. To compare every record in a database with every other record in the same database, a system would need to perform $n^2$ non-trivial operations, where n is the number of records in the database. For example, for a database of 100 million records, a system would need to perform 10 quadrillion operations in order to compare every record to every other record. A typical database management system cannot complete this number of operations in a convenient amount of time, such as during an overnight run. Many systems therefore utilize some variety of optimized method to identify small clusters of potential duplicate records, and then compare records only within those clusters. Known clustering methods include alphabetic grouping, hashing and matchcode clustering.

SUMMARY

In accordance with the teachings described herein, systems and methods are provided for identifying potential duplicate entries in a database. Matchcodes are generated for a plurality of records, wherein a matchcode for a record may be generated by: receiving a character string from the record; determining whether the character string includes a non-essential character substring; if the non-essential character substring is missing from the character string, then generating the matchcode from the character string and adding a wildcard character to the matchcode in place of the missing non-essential character substring; and if the non-essential character substring is included in the character string, then generating the matchcode from the character string with the matchcode including a representation of the non-essential character substring. The matchcodes for the plurality of records may be compared to identify matching pairs of matchcodes, wherein for the purpose of identifying a matching pair of matchcodes, two characters are considered the same if they are equal or if one or both are wildcard characters.

BRIEF DESCRIPTION OF THE DRAWINGS

FIGS. 5-8 illustrate an example of a matchcode scoring analysis to identify potential duplicates among records in a database.

DETAILED DESCRIPTION

Figure 1:
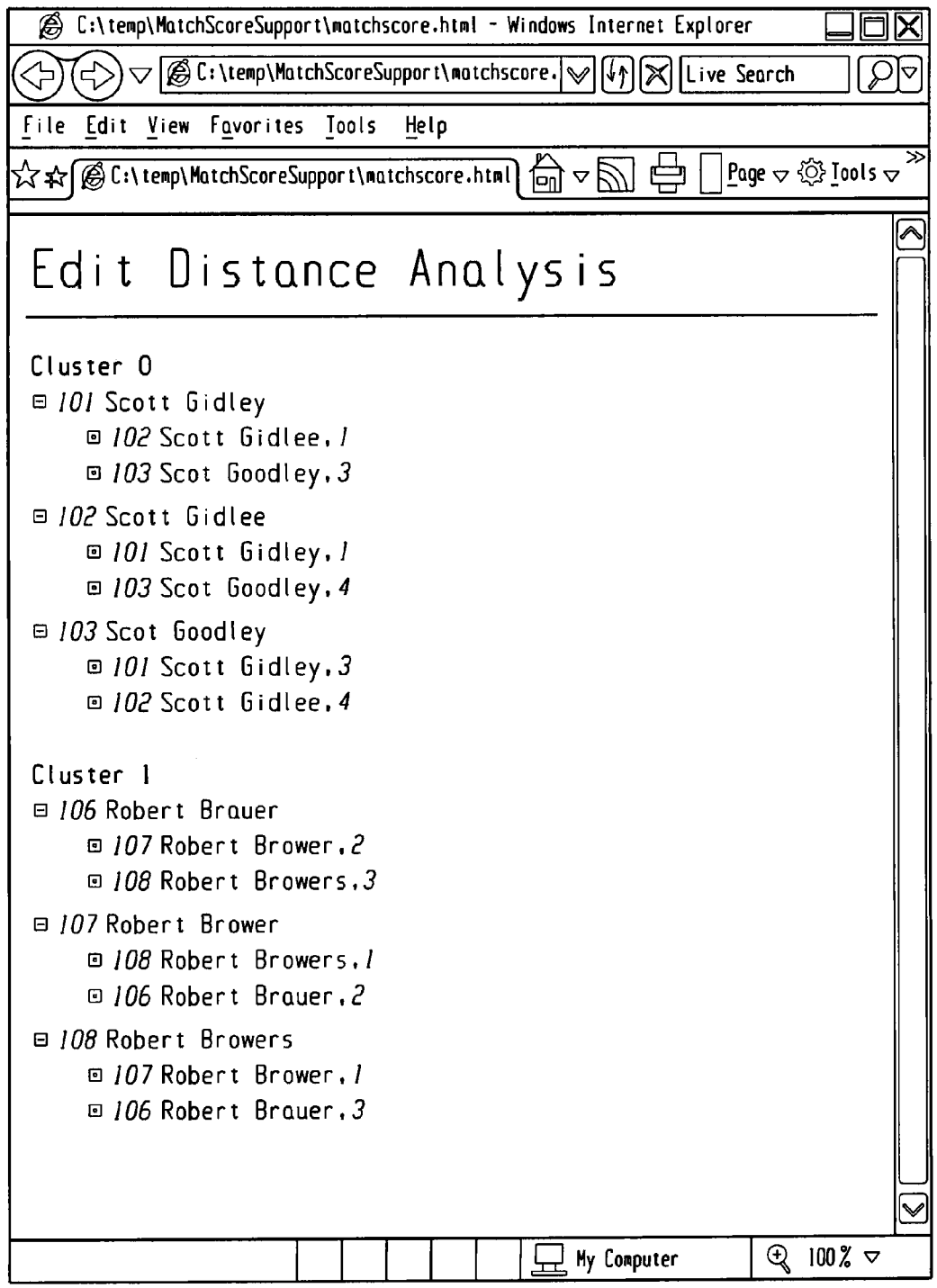
FIGS. 1 and 2 illustrate examples of a character-based analysis to identify potential duplicates among records in a database.

When comparing records within a cluster to identify potential duplicates, one approach is to apply a character-based, string-closeness function to each pair of records, as illustrated in the example shown in FIG. 1. Character-based functions, such as Jaro-Winkler and Levenshtein edit distance, can produce meaningful closeness scores provided that the differences between records in a cluster are limited to spelling variations and/or typographic errors. As an example, consider the analysis of two clusters containing the names of individuals, as illustrated in FIG. 1.

In the example shown in FIG. 1, a character-based, string-closeness function has been applied to clustered database records to generate scores that indicate the estimated distance between each pair of character strings. A higher score means that there is a greater distance between two strings. For instance, in cluster 0, record 101 ("Scott Gidley") and record 102 ("Scott Gidlee") have a distance score of 1. In comparison, record 101 ("Scott Gidley") and record 103 ("Scot Goodley") have a distance score of 3. Therefore, record 101 is considered to be closer to record 102 than it is to record 103. And so on. In this way, the distance scores may be utilized to make some determination as to which records should remain in a particular cluster and which records should be removed.

While character-based scoring functions may produce useful scores when differences are limited to spelling variations and typographical errors, as illustrated in FIG. 1, these types of algorithms may not be as effective when evaluating the closeness of records that contain differences that are lexical or semantic in nature. This is illustrated by the example shown in FIG. 2.

Figure 2:
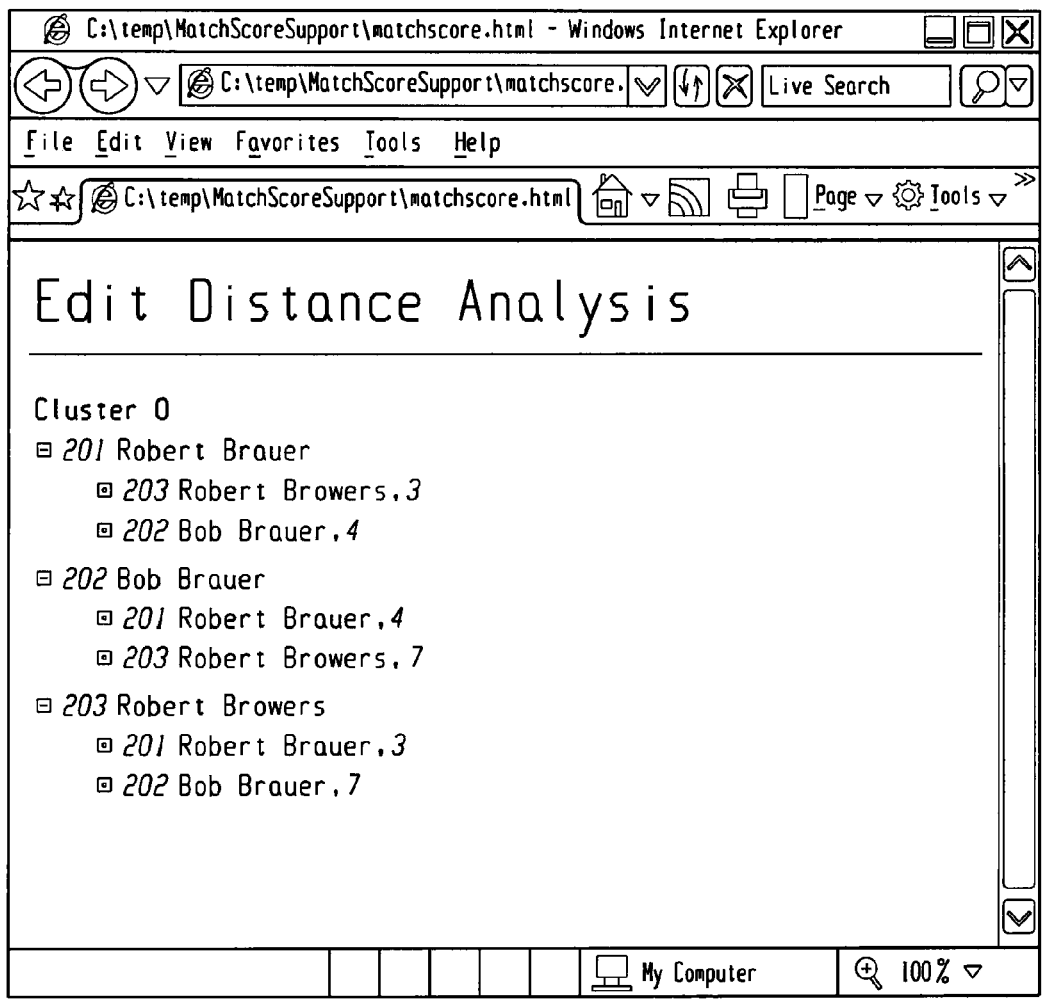

In the example depicted in FIG. 2, a character-based, string-closeness function is again used to analyze a cluster of records containing the names of individuals. In this example, the scoring algorithm gives records 201 and 202 ("Robert Brauer" and "Bob Brauer") a higher distance score than records 201 and 203 ("Robert Brauer" and "Robert Browers".) The reason for this is that the given names in records 201 and 202 differ greatly in terms of the characters that make up the words. However, it can be argued that there is actually a high probability that records 201 and 202 represent the same individual because "Bob" is a diminutive form of the name "Robert." It can therefore be reasoned that "Robert Brauer" and "Bob Brauer" are in fact closer than "Robert Brauer" and "Robert Browers." Thus, a purely character-based string scoring algorithm may not produce optimal results for all clusters.

To achieve meaningful distance scores for records that are semantically similar but contain lexigraphic differences, such as shown in the example of FIG. 2, a knowledge-based method of comparison may be needed. One such knowledge-based comparison method is a deterministic matchcode-generation function. A matchcode is a fuzzy representation of a character string that is generated by applying transformations that normalize the string, strip away semantically insignificant components, and perform phonetic reductions. Two character strings that yield the same matchcode are considered to match. For example, consider the example illustrated in FIG. 3.

Figures 3, 4:
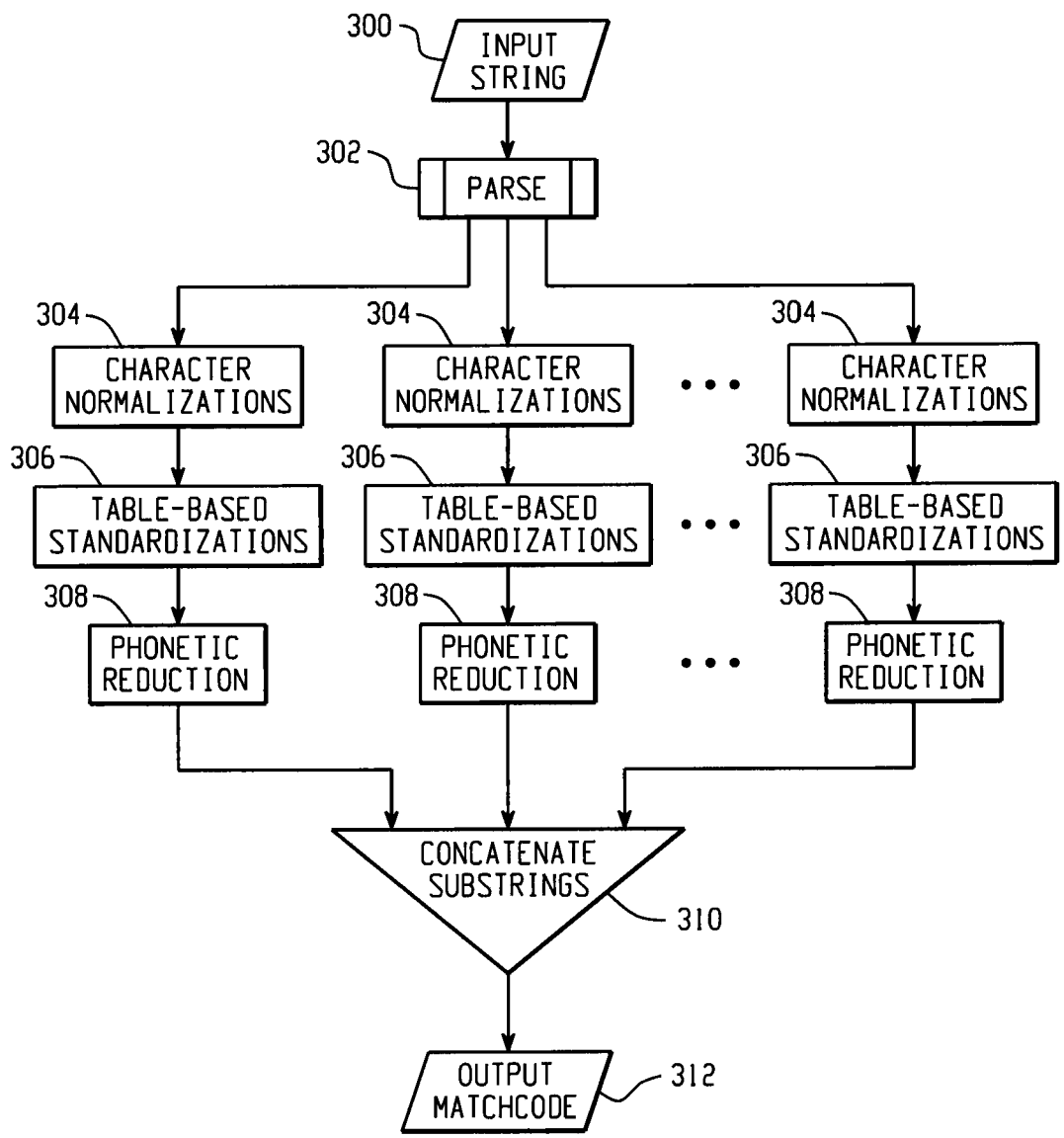
FIG. 3 illustrates an example of a matchcode analysis to identify potential duplicates among records in a database.
FIG. 4 illustrates an example method for generating a matchcode.

FIG. 3 depicts an example of matchcodes generated for two records respectively containing the individual names "ROBERT J. BROWER" and "MR BOB BRAUER." A person who is familiar with North American or Western European names may conclude that these two particular names could represent the same individual. This can be inferred because: (1) the honorific prefix "MR" may optionally be included or omitted when writing a name; (2) the name "BOB" is a diminutive commonly used as a nickname for "ROBERT"; (3) a middle initial, such as "J." may be optionally included or omitted when writing a name; and (4) the name "BROWER" may be a misspelling of "BRAUER," or vice versa. As illustrated in FIG. 3, a software system utilizing a matchcode generation function would generate the same matchcode for each of these records, because the matchcode generated for any given record is a fuzzy representation of the record's canonical value, and these records happen to share a common canonical value. A comparison of matchcodes may then be used to determine that the two names should be clustered together, while other names with different matchcodes would be organized into separate and different clusters.

An example matchcode generation method is depicted in FIG. 4. At 300, an input string is received. For instance, in the example illustrated in FIG. 3 an input string may be the name "ROBERT J. BROWER." The input string is parsed at 302 into meaningful atomic substrings (e.g., given name, middle name, etc.), for example using a natural language parsing function. Context-specific transformations are then applied to each substring, as illustrated by the parallel paths following 302 in FIG. 4. The transformations may include character normalization 304, such as punctuation cleaning/removal, table-based standardizations 306 (e.g., BOB to ROBERT), and phonetic reduction 308, such as the removing or reducing vowels and transforming similar sounds to basic spellings. At 310, the transformed substrings are concatenated and padding characters are added, as necessary, to generate the matchcode 312.

The transformations are performed separately on different substrings (e.g., in the parallel paths shown in FIG. 4) because the semantic context may be different in each substring. For example, the matchcode generation method might standardize the value "MISTER" to the canonical form "MR" if it appears as an honorific prefix. But, the method should not transform "MISTER" to "MR" if it appears in a family name substring (e.g., JOHN MISTER). This logic also extends to the application of other types of transformations, such as character-based cleaning and phonetic reductions.

The specific transformations performed on the substrings and the format of the resultant matchcode 312 may, for example, be controlled by a set of matchcode generation rules. For instance, in the example illustrated in FIG. 3, the matchcode generation rules may specify a matchcode format that includes two transformed substrings (one for the first name and one for the last name) and padding characters ("$") to make up a 15 character matchcode. The matchcode rules in the example of FIG. 3 may further specify the use of table-based mappings to canonical values (e.g., BOB to ROBERT) and phonetic reduction by removing/reducing vowels (e.g., ROBERT to RBRT) and transforming similar sounds to basic spellings (e.g., BROWER and BRAUER to BRWR).

The matchcode generation rules may include a sensitivity level parameter that is used to determine transformations performed on the substrings. That is, different transformations may be performed depending on what level of sensitivity is specified. For instance, at lower sensitivity levels, the matchcode generation function may omit optional components of a name, such as a prefix, suffix, or middle name. Additionally, at a lower sensitivity the function may perform more aggressive table-based transformations or phonetic reductions. The result of the additional transformations is a "fuzzier" matchcode.

The sensitivity-based level of fuzziness means that in general two strings can be considered to be close to each other if they produce identical matchcodes at a high sensitivity level. Conversely, two strings are not considered to be close to each other if they produce identical matchcodes at low sensitivity levels, or never. A good method for determining the closeness of records within a cluster is to find the highest sensitivity level at which each pair of records produces the same matchcode. For instance, consider the example depicted in FIG. 5.

Figure 5:
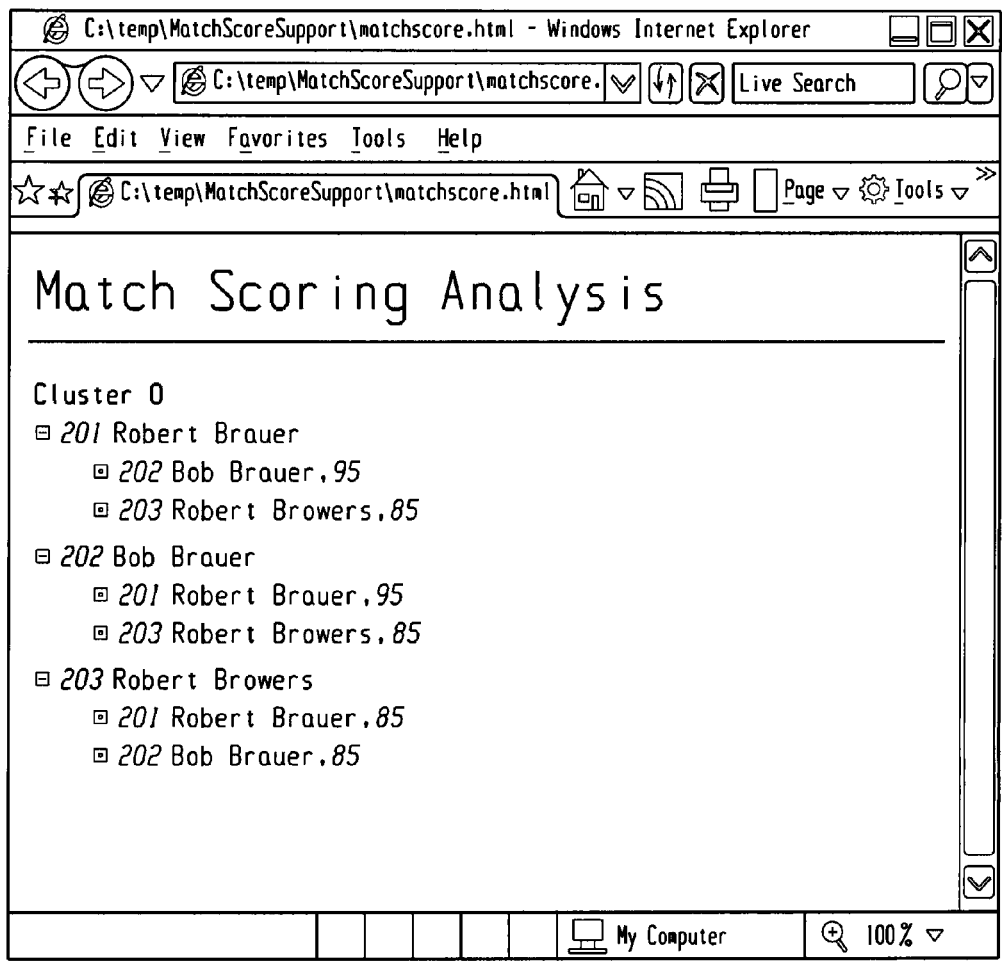

In the example illustrated in FIG. 5, the score for each pair of records in the cluster represents the highest sensitivity level at which the two records produced the same matchcode. For instance, records 201 and 202 ("Robert Brauer" and "Bob Brauer") produced the same matchcode at a maximum sensitivity level of 95, and records 201 and 203 ("Robert Brauer" and "Robert Browers") produced the same matchcode at a maximum sensitivity level of 85. Thus, using this method, records 201 and 202 ("Robert Brauer" and "Bob Brauer") are assigned a higher closeness score (95) than records 201 and 203 ("Robert Brauer" and "Robert Browers.")

An advantage of using matchcode generation in cluster analysis is that matchcode generation and comparison is typically more efficient than performing a knowledge-based comparison of each pair of records. A knowledge-based comparison of two strings requires complex operations, such as string parsing, normalization, lexicon lookups, and phonetic reductions. To compare each pair of records in a cluster, a system would need to perform $m^2$ sets of operations, where m is the number of records in the cluster. To perform a matchcode-based comparison, however, the system must perform only m sets of complex analytical operations in order to generate matchcodes for the m records in the cluster. It then performs $m^2$ operations to compare the matchcodes for each pair of records in the cluster. But these $m^2$ operations can be comparatively simple operations, such as simple string comparisons that determine whether the matchcodes for the two records are identical. Thus, a method of matchcode generation and comparison is typically more efficient than a method of pairwise knowledge-based comparisons.

The matchcode-generation method of record comparison efficiently produces meaningful and intuitive scores for records that are related semantically or by spelling, as demonstrated in the example of FIG. 5. However, the method has a weakness compared to the pairwise knowledge-based comparison method when strings in a cluster contain optional components that are of limited significance. For example, consider database records that include the following names:
Robert J Brauer
Robert Brauer Because the middle initial may be included or excluded from any particular name in a database, a system could omit the middle name when generating a matchcode, such that names like the two shown above will produce the same matchcode, as shown in the example depicted in FIG. 6A. A consequence of omitting the middle name from the matchcode, however, is that names containing different middle names will also produce the same matchcode, as shown in the example depicted in FIG. 6B.

As shown in FIGS. 6A and 6B, by omitting the middle name from the matchcode, records 301 and 302 will produce a high closeness score, as desired. However, records 302 and 303 could also be assigned a high closeness score, even though these are likely two different individuals. This is the classic "all or nothing" problem associated with matchcode comparisons. If a system generates matchcodes that contain non-essential components of the input string, then false negatives may occur. Yet if matchcodes omit the non-essential components, this may result in false positives.

Figure 7:
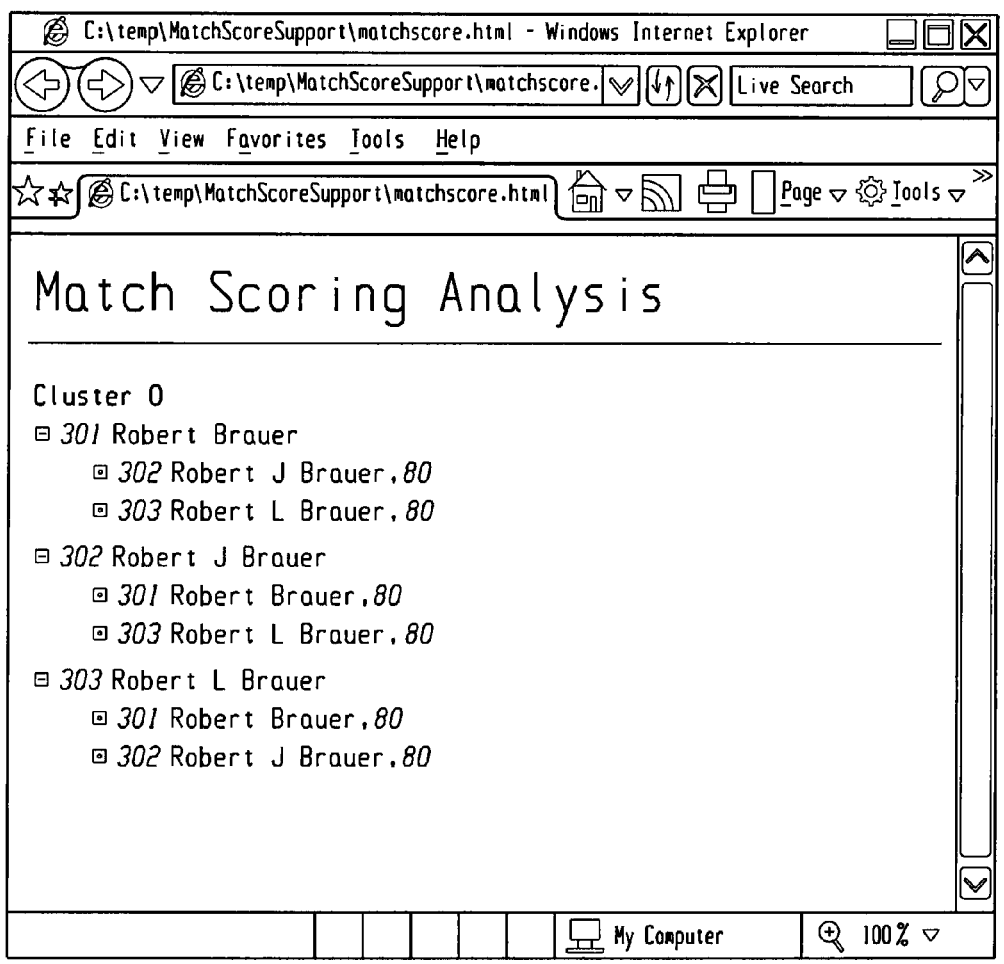

FIG. 7 depicts an example of results that may be obtained from matchcode comparisons when the middle name is included in matchcodes generated at high sensitivity levels. In the illustrated example, records 302 and 303 ("Robert J Brauer" and "Robert L Brauer") are correctly assigned a low closeness score of 80. However, records 301 and 302 ("Robert Bauer" and "Robert J Brauer") are also assigned a low closeness score of 80, as are records 301 and 303 ("Robert Brauer" and "Robert L Brauer".) This happens because the matchcodes for record 301 are not identical to the matchcodes for records 302 and 303 at high sensitivities, since the matchcodes for records 302 and 303 contain middle names. The string-comparison function that is used to compare matchcodes does not understand semantic contexts. It simply concludes that matchcodes for record 301 are not identical to the matchcodes for records 302 and 303 at high sensitivities.

Figure 8:
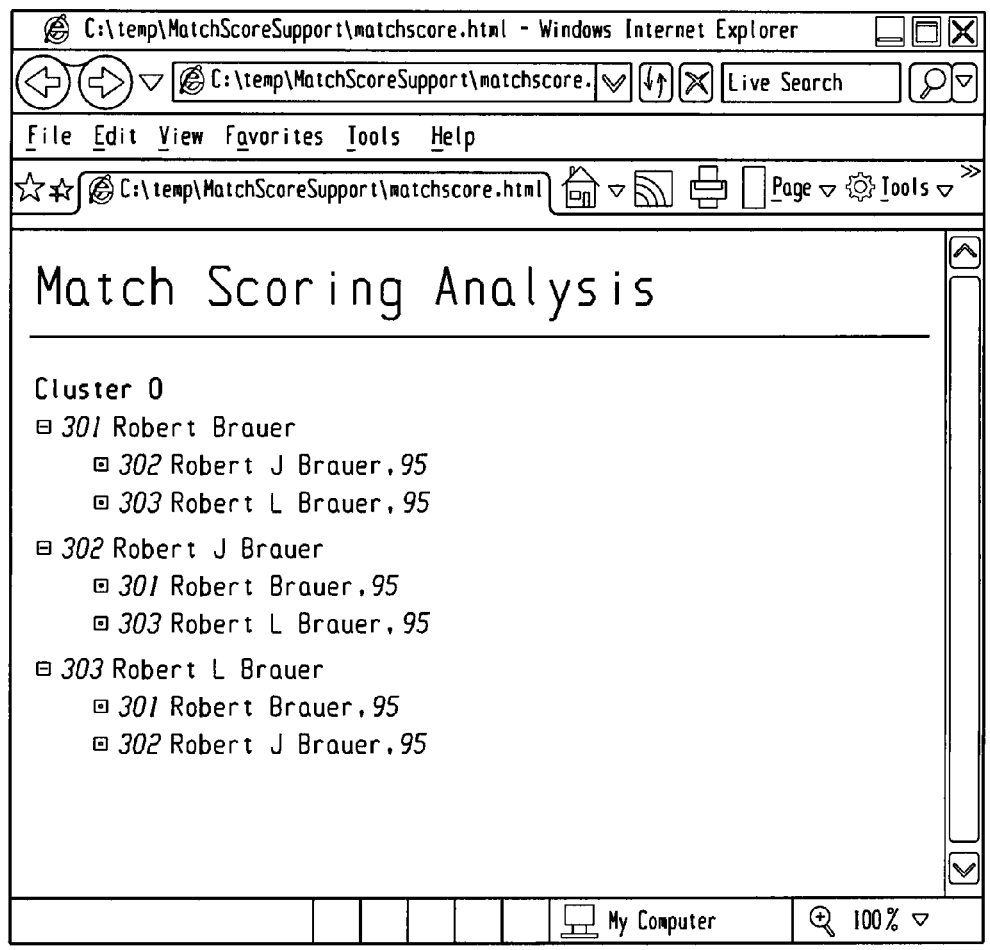

Now consider the example illustrated in FIG. 8, which may be obtained by omitting the middle name from the matchcode. In this example, record 301 ("Robert Brauer") is correctly assigned a high closeness score of 95 when compared to records 302 and 303 ("Robert J Brauer" and "Robert L Brauer".) But record 302 ("Robert J Brauer") is incorrectly assigned a high closeness score of 95 when compared to record 303 ("Robert L Brauer".) Of course, this problem could be avoided by abandoning the matchcode generation and comparison method, and instead implementing a pairwise comparison method. But, as explained above, such a system would need to perform expensive operations for each pair of strings, instead of making one pass through a cluster to generate matchcodes for each record and then simply comparing matchcodes for each pair of records.

Figures 9, 10:
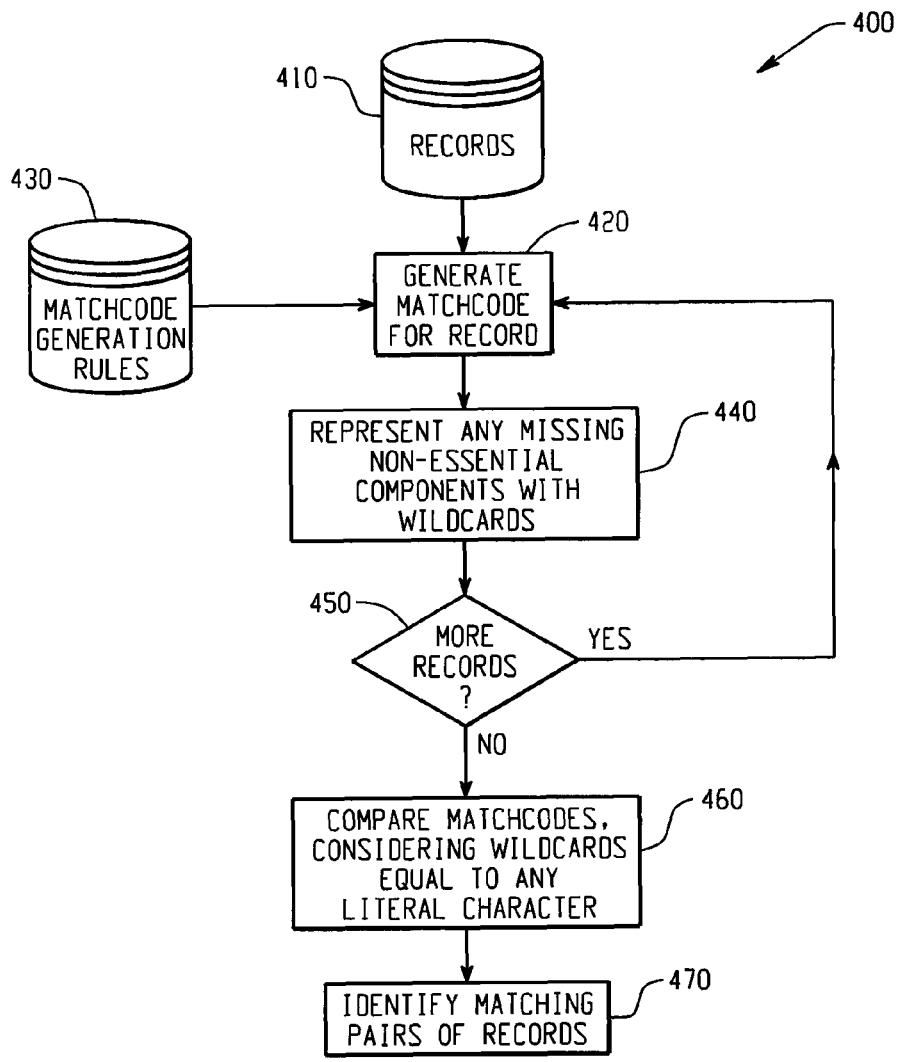
FIG. 9 illustrates an example of a matchcode comparison utilizing wildcards in place of missing non-essential character substrings.
FIGS. 10 and 11 are flow diagrams depicting a example methods for identifying potential duplicate records in a database using a matchcode comparison with wildcards.

FIG. 9 illustrates an example of an efficient solution to the "all or nothing" problem associated with matchcode generation in cluster analysis by using wildcard characters (e.g., "?") to represent non-essential string components (i.e., non-essential substrings). During matchcode generation, a wildcard character is inserted into the matchcode in place of a missing non-essential component of the string. In the illustrated example, the missing middle name field in record 301 is represented in the resultant matchcode by the wildcard character "?". For records 302 and 303, the middle name is represented in the resultant matchcodes by a literal character (i.e., "J" and "L"). Other examples of non-essential character substrings may include generational suffixes in names (e.g., JR, SR, etc.), honorific prefixes in names (e.g., MR, MRS, DR, etc.), neighborhood names in addresses, site or franchise information in company names, etc.

In order to compare matchcodes that may include wildcard characters, the matchcode comparison function may be modified such that, in order for two matchcodes to match, they must be identical, except that a wildcard character is considered to match any literal character. In the example illustrated in FIG. 9, the matchcode comparison function would determine that record 301 matches records 302 and 303, but that records 302 and 303 do not match.

FIG. 10 is a flow diagram depicting an example method 400 for identifying potential duplicate records in a database 410 using a matchcode comparison with wildcards. At 420, a character string is retrieved from a record, and matchcode generation rules 430 are applied to generate a matchcode from the character string. Then, at 440, one or more wildcard characters are added to the matchcode in place of any missing non-essential components of the character string. The matchcode generation rules 430 may, for example, determine the specific transformations to perform on each substring (e.g., including or omitting non-essential substrings, table-based mappings to canonical values, phonetic reductions, transforming similar sounds to basic spellings, etc.) based on a sensitivity level parameter. In addition, the matchcode generation rules 430 may also specify which substrings are non-essential components of the character string.

At 450, the method returns to step 420 until matchcodes have been created for each record to be considered in the matchcode comparison. When all of the matchcodes have been generated, the method proceeds to 460, where the matchcodes are compared to identify matching pairs 470. For the purpose of identifying a matching pair of matchcodes, two characters are considered the same if they are equal or if one or both are wildcard characters.

Figure 11:
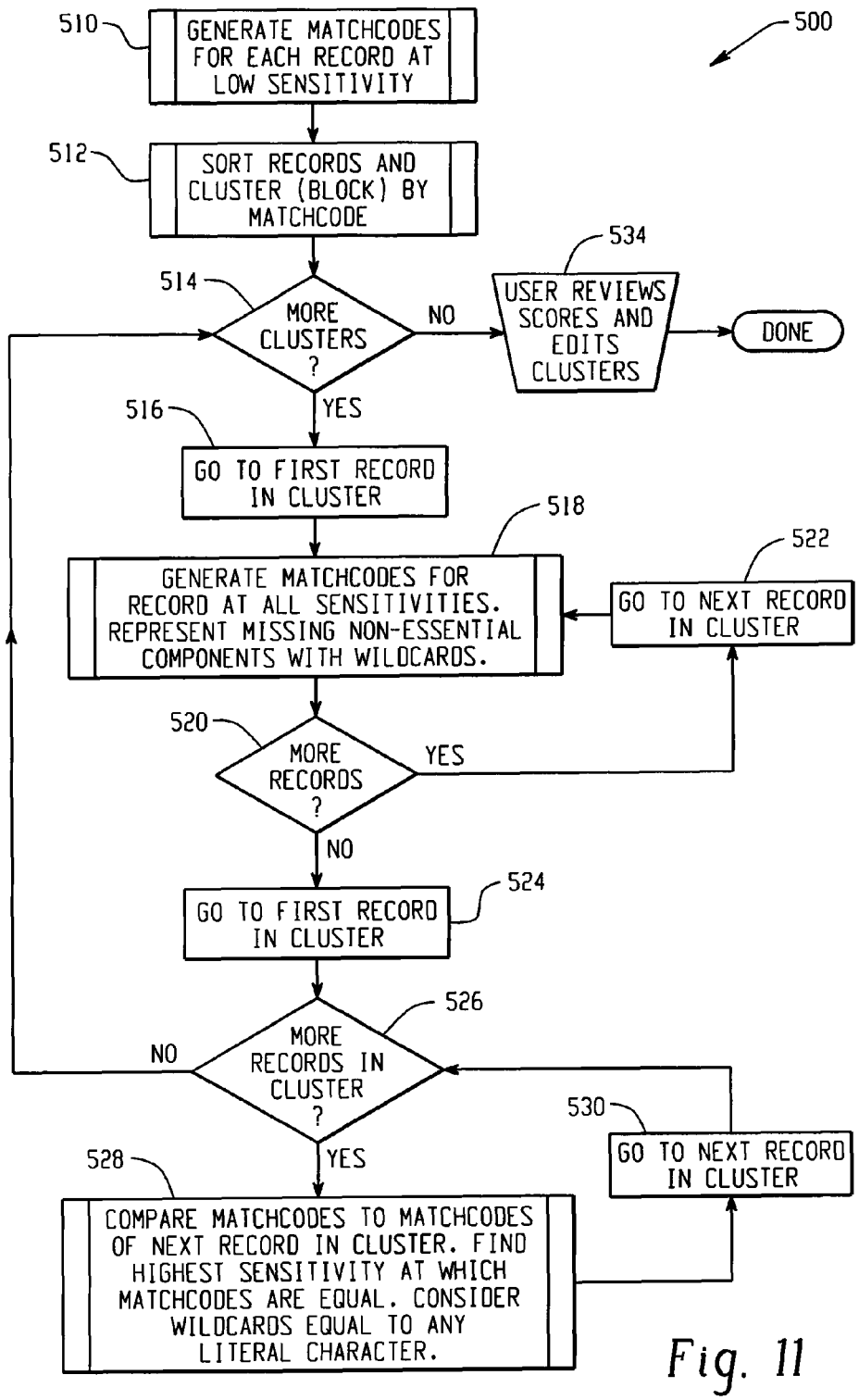

FIG. 11 is a flow diagram depicting another example method 500 for identifying potential duplicate records in a database using a matchcode comparison with wildcards. At 510, matchcodes are generated for each record in the analysis at a low sensitivity level. For instance, at the low sensitivity level, the matchcode generation rules may require that non-essential character substrings be omitted from the matchcode. The records are then sorted into clusters at 512 based on the low sensitivity matchcodes.

Decision block 514 sets up a loop to perform a matchcode comparison analysis on each of the clusters generated at 512. At 516, the method is directed to the first record in the cluster. Then, at 518, matchcodes are generated for the record at each of a plurality of sensitivity levels. Where non-essential substrings are represented in the matchcode (e.g., at higher sensitivity levels), any missing non-essential substrings are represented in the matchcode by a wildcard character. Steps 520 and 522 then cause the matchcode generation process of step 518 to be performed for every record in the cluster. When matchcodes have been generated for each record in the cluster, the method proceeds to 524 where the method is directed to the first record in the cluster. Then at 526, the method sets up another loop to compare the matchcodes within the cluster.

At 528, the matchcodes for the currently selected record are compared to the matchcodes for the next record in the cluster to determine the highest sensitivity level at which the two records have matching matchcodes. This highest sensitivity level is then recorded as the closeness score for the matchcode pair. For the purpose of identifying a matching pair of matchcodes, two characters are considered the same if they are equal or if one or both are wildcard characters. The method then proceeds to the next record in the cluster at 530, and the comparison loop is repeated at 526 until the matchcode comparison has been performed for all of the records in the cluster. When all of the records have been compared, the method returns to 514. If there is another cluster for analysis, the method returns to 516. Otherwise, the method proceeds to 532 where the resulting matchcode scores are utilized to edit the clusters.

Figure 12:
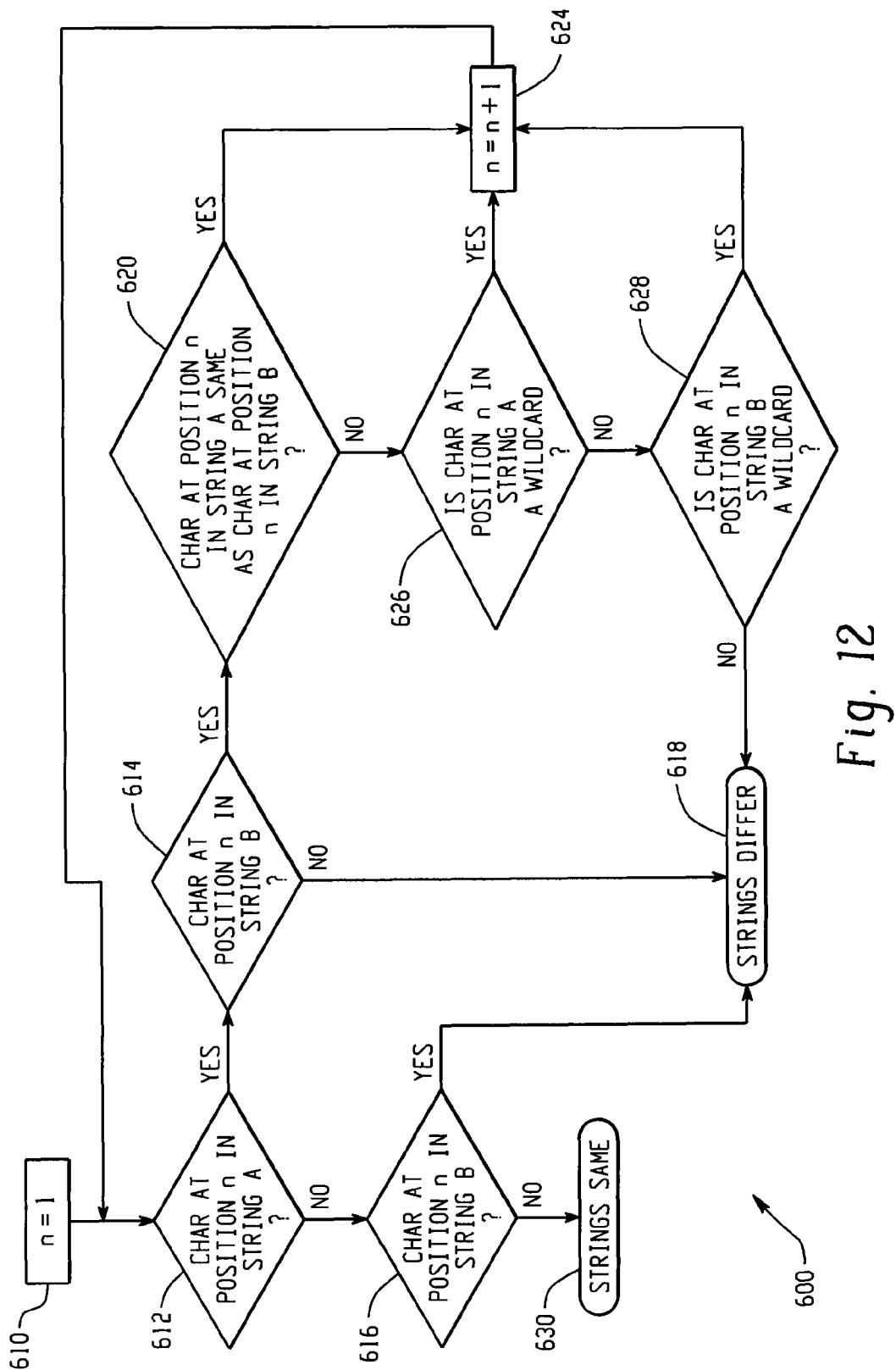
FIG. 12 is a flow diagram of an example method for comparing matchcode strings.

FIG. 12 is a flow diagram depicting an example method 600 for comparing matchcodes. The method depicted in FIG. 12 may, for example, be utilized by step 460 in FIG. 10 or by step 528 in FIG. 11. The example method 600 depicted in FIG. 12 compares two matchcode strings, "string A" and "string B," each of which is formatted according to a matchcode format having n positions. At 610, n is set to 1.

At 612, the method determines if matchcode "string A" has a character at position n. Depending on the result of step 612, the method proceeds to either step 614 or step 616 to similarly determine if matchcode "string B" has a character at position n. If one matchcode string has a character at position n and the other does not, then the method determines that the matchcode strings differ at 618. If both matchcode strings have a character at position n, however, then the method proceeds to step 620.

At 620, the method determines if the character at position n in matchcode string A is the same as the character at position n in matchcode string B. If so, then the characters at position n in both matchcode strings are considered a match, the value of n is incremented at 624, and the method returns to 612. Otherwise, the method proceeds to 626.

At 626, the method determines if the character at position n in matchcode string A is a wildcard character. If so, then the characters at position n in both matchcode strings are considered a match, the value of n is incremented at 624, and the method returns to 612. Otherwise, the method proceeds to 628.

At 628, the method determines if the character at position n in sting B is a wildcard character. If so, then the characters at position n in both wildcard strings are considered a match, the value of n is incremented at 624, and the method returns to 612. Otherwise, the method determines that the matchcode strings differ at 618 because the characters at position n in the two matchcode strings do not match (step 620) and neither matchcode string includes a wildcard character (steps 626 and 628).

The method 600 continues until either (a) it is determined that the strings differ at 618 or (b) it is determined at 630 that there are no characters at position n in either matchcode string A or matchcode string B, indicating that the method has reached the end of the matchcode strings and that string A and string B are a match.

Figure 13:
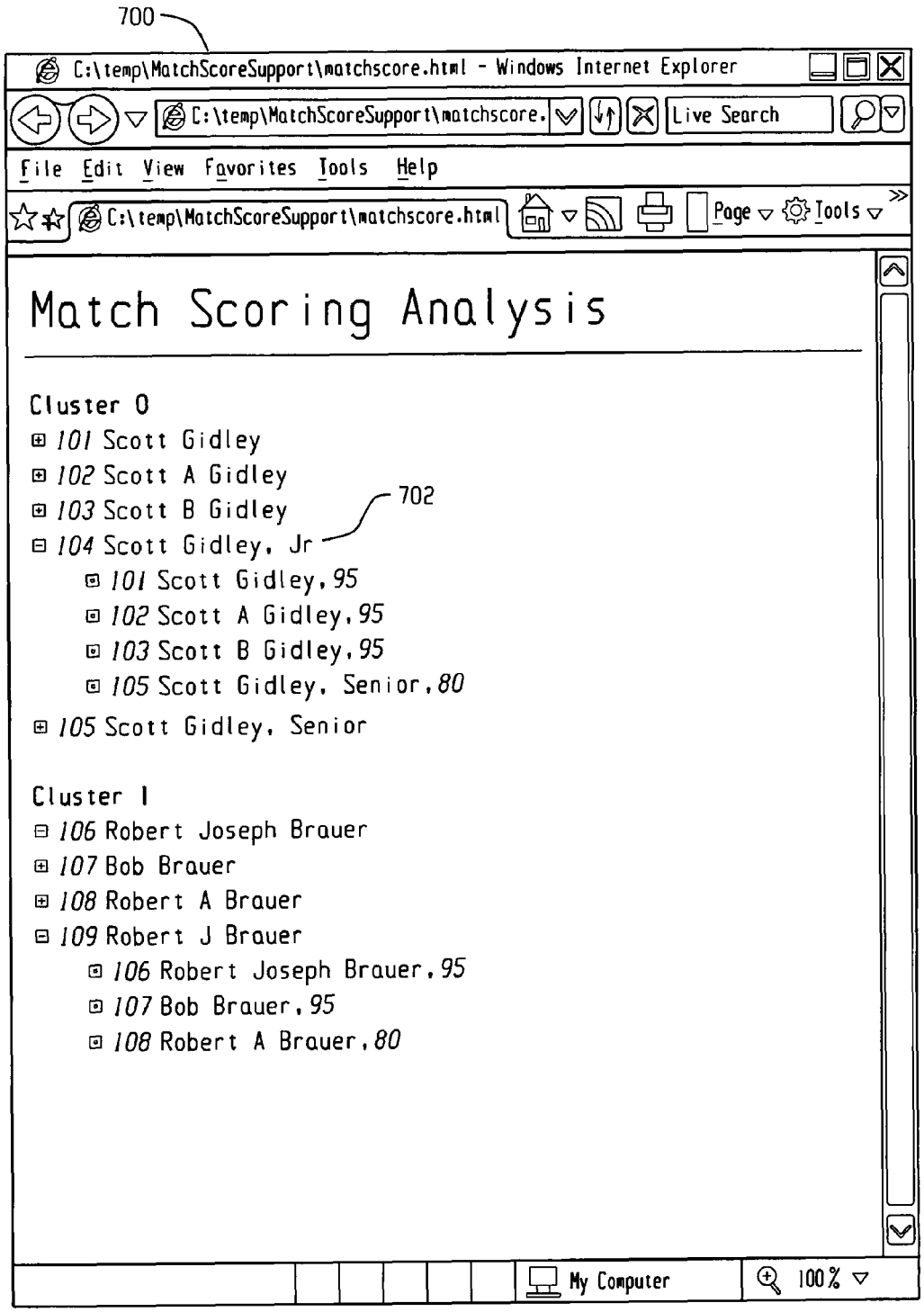
FIG. 13 depicts an example of a matchcode scoring analysis using wildcards in place of missing non-essential character substrings.

FIG. 13 depicts an example of a matchcode scoring analysis performed using the example methods set forth in FIGS. 11 and 12. In the illustrated example, the records have been sorted into two clusters based on matchcode comparisons at a low sensitivity level (e.g., at steps 510 and 512 in FIG. 11). The results of the matchcode scoring analysis are displayed on an example user interface 700, on which the comparison results are shown for record 104 ("Scott Gidley, Jr.") in Cluster 0 and for record 109 ("Robert J. Brower") in Cluster 1. In the illustrated example, the matchcode scoring analysis results for the other records in the clusters are hidden from view, for example by selecting an icon 702 on the user interface 700.

In the illustrated example, the middle name substring and the generational substring (e.g., JR, SR) are omitted from the matchcode at the low sensitivity level of 80. Therefore, at low sensitivity (80), records 104 and 105 ("Scott Gidley, Jr." and "Scott Gidley, Senior") and records 109 and 108 ("Robert J Brower" and "Robert A Brauer") have the same matchcodes. However, at a higher sensitivity level of 95, wildcard characters are inserted into the matchcodes in place of any missing non-essential substrings, such as the middle name and generational substrings, and two characters are considered the same if they are equal or if one or both are wildcard characters. Therefore, at the higher sensitivity level of 95, records 104 and 105, as well as records 109 and 108, no longer have the same matchcodes.

Accordingly, the highest sensitivity level at which record pair 104/105 ("Scott Gidley, Jr." and "Scott Gidley, Senior") or record pair 109/108 ("Robert J Brower" and "Robert A Brower") are considered a match is level 80. Record pairs 104/105 and 109/108 are thus given a closeness score of 80. In comparison, when wildcard characters are used at the higher sensitivity level of 95, record 104 is still considered a match with each of records 101, 102 and 103, and record 109 is still considered a match with records 106 and 107. Therefore, these record pairs are given a closeness score of 95.

As demonstrated in the example shown in FIG. 13, the use of wildcard characters in a matchcode scoring analysis provides an efficient way to generate pairwise scores that represent the likelihood that two records represent the same entity. The scores reflect semantic closeness and make allowance for the inclusion/omission of non-essential components of the character strings. It should be understood, however, that although the examples illustrated herein show the application of a matchcode scoring analysis to the "name" string in records, in practice it may be applied to any text-based record data.

Figure 14A:
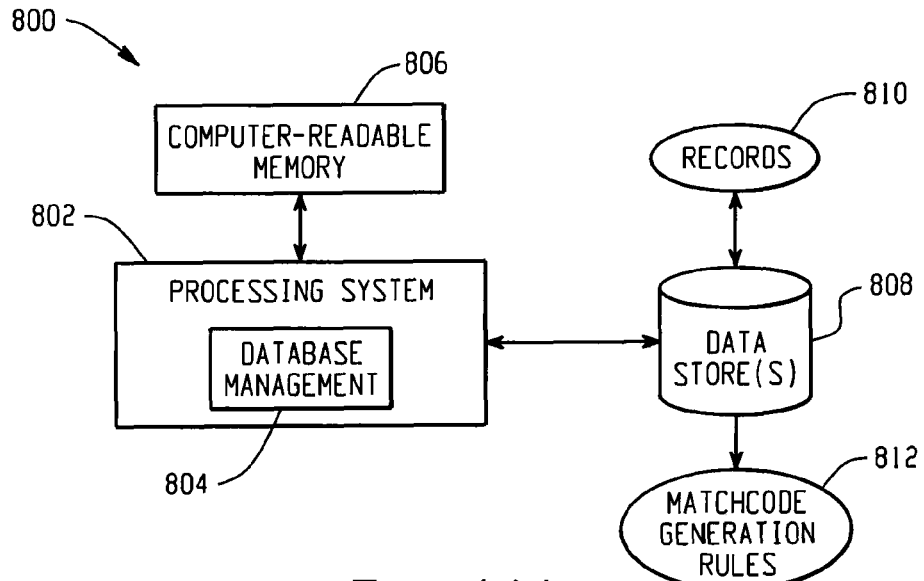
FIGS. 14A, 14B, and 14C depict examples of systems that may be used to identify potential duplicate entries in a database.
Figure 14B:
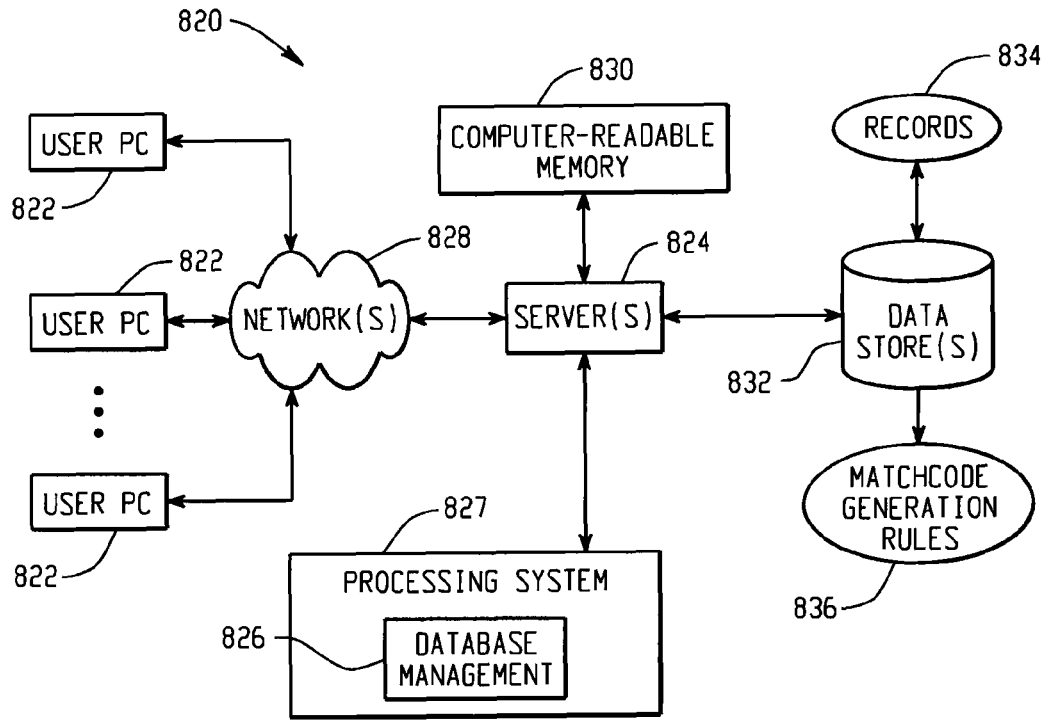
Figure 14C:
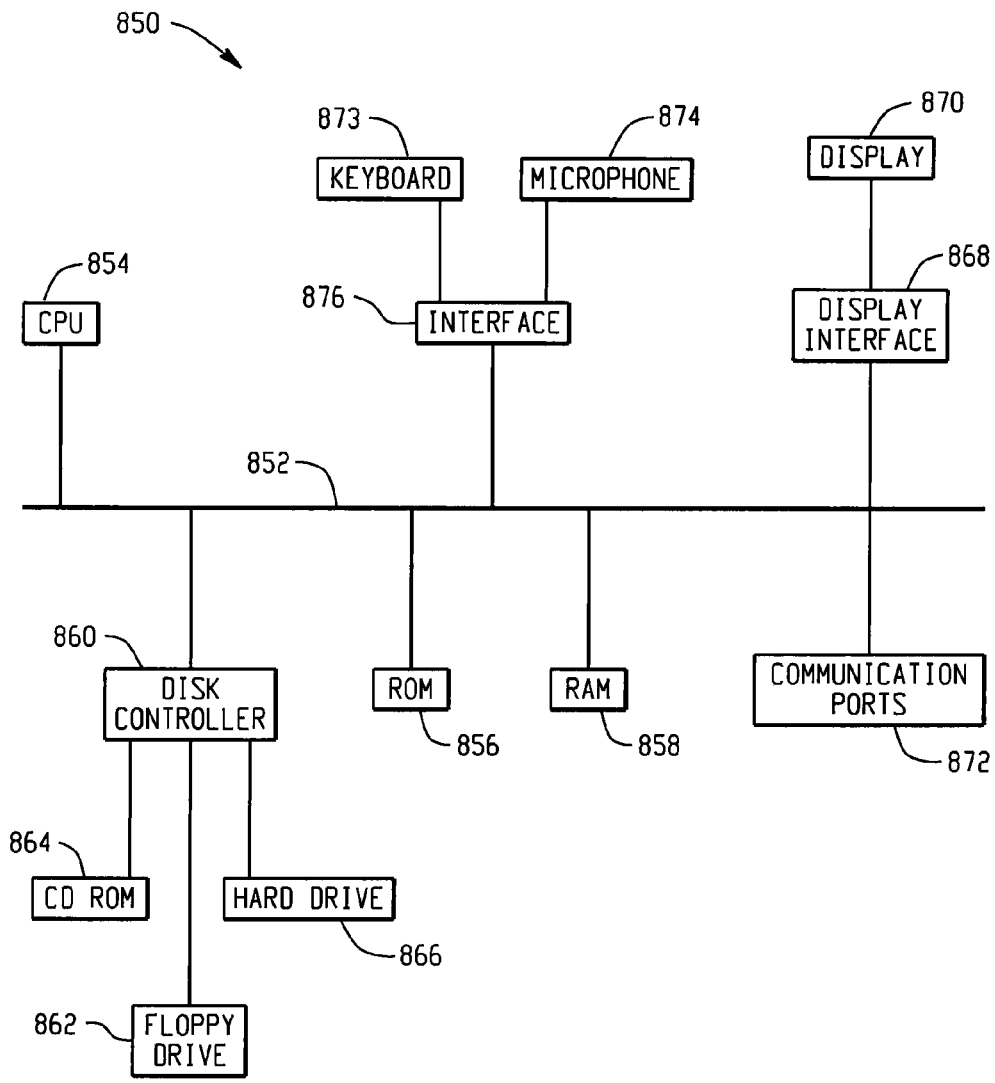

FIGS. 14A, 14B, and 14C depict examples of systems that may be used to identify potential duplicate entries in a database. For example, FIG. 14A depicts an example of a system 800 that includes a standalone computer architecture where a processing system 802 (e.g., one or more computer processors) includes database management application 804 being executed on it. The processing system 802 has access to a computer-readable memory 806 in addition to one or more data stores 808. The one or more data stores 808 may include a plurality of records 810 and matchcode generation rules 812.

FIG. 14B depicts a system 820 that includes a client server architecture. One or more user PCs 822 access one or more servers 824 running a database management program 826 on a processing system 827 via one or more networks 828. The one or more servers 824 may access a computer readable memory 830 as well as one or more data stores 832. The one or more data stores 832 may contain database records 834 and matchcode generation rules 836.

FIG. 14C shows a block diagram of an example of hardware for a standalone computer architecture 850, such as the architecture depicted in FIG. 14A that may be used to contain and/or implement the program instructions of system embodiments of the present invention. A bus 852 may connect the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for identifying potential duplicate entries in a database. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 852 to be displayed on a display 870 in audio, graphic, or alphanumeric format. Communication with external devices may optionally occur using various communication ports 872.

In addition to the standard computer-type components, the hardware may also include data input devices, such as a keyboard 873, or other input device 874, such as a microphone, remote control, pointer, mouse and/or joystick.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:
   accessing records, wherein:
      the records include first records and second records;
      accessing the records is performed on a computing device
      each of the records includes a respective essential field and a respective nonessential field, and wherein:
         in each of the first records and in each of the second records, the respective essential field includes an essential substring;
         in each of the first records, the respective nonessential field includes a nonessential substring; and
         in each of the second records, the respective nonessential field is empty;
   for each of the records, deriving:
      a first matchcode that includes a first fuzzy representation of the respective essential substring; and
      a second matchcode that includes a second fuzzy representation of the respective essential substring, wherein the second fuzzy representation is different than the first fuzzy representation, and wherein:
         each of the second matchcodes derived for a first record includes a nonessential field matchcode segment that represents the respective nonessential substring; and
         each of the second matchcodes derived for a second record includes a wildcard character segment that is deemed to be equivalent to each of the nonessential field matchcode segments;
   forming first matchcode equivalence clusters by selectively grouping the records such that first matchcodes for records grouped together are equivalent, wherein forming the first matchcode equivalence clusters is done independently of record type;
   within at least one of the first matchcode equivalence clusters, further grouping at least one of the records with at least one of the other records, wherein grouping within each of the at least one first matchcode equivalence clusters:
      is done such that second matchcodes for records grouped together are equivalent; and
      is done independently of similarities between records in different first matchcode equivalence clusters; and
   identifying matches amongst the records based on the grouping within the at least one first matchcode equivalence cluster.

2. The method of claim 1, wherein at least one of the essential substrings includes a middle name substring, a generational substring, or a title substring.

3. The method of claim 1, wherein each of the first matchcodes and each of the second matchcodes is generated based on matchcode generation rules.

4. The method of claim 3, wherein the matchcode generation rules include a sensitivity level.

5. The method of claim 4, wherein a sensitivity level controls an amount of record transformation involved in generating matchcodes.

6. The method of claim 1, wherein, for one of the first records, forming the second matchcode includes:

applying a context-specific transformation to the essential substring contained in the respective essential field.

7. The method of claim 1, wherein:
each of the first fuzzy representations is a phonetic reduction of the respective essential substring.

8. The method of claim 7, wherein each of the phonetic reductions includes all original consonants from the respective substring and does not include any vowels.

9. The method of claim 1, wherein each of the essential substrings includes a first name, and wherein the method further comprises:
with respect to at least one of the first records:
forming the first fuzzy representation by retrieving an alternate spelling of the first name included in the respective essential substring.

10. The method of claim 9, wherein:
the alternate spelling is retrieved from a table that includes names that are individually indexed to alternate spellings.

11. The method of claim 1, wherein identifying matches amongst the records includes:
determining that the second matchcode for one of the first records is equivalent to the second matchcode for another one of the first records, wherein determining includes:
determining that the second fuzzy representation of the essential substring included in the one of the first records is equivalent to the second fuzzy representation of the essential substring included in the another of the first records; and
determining that the following are equivalent:
the nonessential field matchcode segment that represents the nonessential substring included in the one of the first records; and
the nonessential field matchcode segment that represents the nonessential substring included in the another one of the first records.

12. The method of claim 1, wherein identifying matches amongst the records includes:
determining that the second matchcode for one of the first records is equivalent to the second matchcode for one of the second records, wherein determining includes:
determining that the second fuzzy representation of the essential substring included in the one of the first records is equivalent to the second fuzzy representation of the essential substring included in the one of the second records; and
determining that the matchcode for the one of the second records includes a wildcard character.

13. The method of claim 1, further comprising:
within each of the first matchcode equivalence clusters, further grouping at least one of the records with at least one of the other records;
evaluating each of the groupings of the records within first matchcode equivalence clusters, wherein evaluating includes:
providing a first score component to each of the groupings that includes exclusively first records;
providing a second score component to each of the groupings that includes one of the first records and one of the second records, wherein the second score component is lower than the first score component; and
providing a third score component to each of the groupings that includes exclusively second records, wherein the third score component is lower than the second score component.

14. The method of claim 13, wherein identifying matches amongst the records is done such that:
each of the identified matches is between records in one of the evaluated groupings; and
for each of the records, being grouped with any other of the records is a condition precedent for being identified as matching that record.

15. The method of claim 1, wherein:
each of the first fuzzy representations is a phonetic reduction of the respective essential substring.

16. The method of claim 15, wherein the phonetic reduction includes all original consonants from the respective substring and does not include any vowels.

17. A computer-implemented system comprising:
a processor configured to perform operations including:
accessing records, wherein:
the records include first records and second records;
each of the records includes a respective essential field and a respective nonessential field, and wherein:
in each of the first records and in each of the second records, the respective essential field includes an essential substring;
in each of the first records, the respective nonessential field includes a nonessential substring; and
in each of the second records, the respective nonessential field is empty;
for each of the records, deriving:
a first matchcode that includes a first fuzzy representation of the respective essential substring; and
a second matchcode that includes a second fuzzy representation of the respective essential substring, wherein the second representation is different than the first representation, and wherein:
each of the second matchcodes derived for a first record field matchcode segment that represents the respective nonessential substring; and
each of the second matchcodes derived for a second record includes a wildcard character segment that is deemed to be equivalent to each of the nonessential field matchcode segments;
forming first matchcode equivalence clusters by selectively grouping the records such that first matchcodes for records grouped together are equivalent, wherein forming the first matchcode equivalence clusters is done independently of record type;
within at least one of the first matchcode equivalence clusters, further grouping at least one of the records with at least one of the other records, wherein grouping within each of the at least one first matchcode equivalence clusters:
is done such that second matchcodes for records grouped together are equivalent; and
is done independently of similarities between records in different first matchcode equivalence clusters; and
identifying matches amongst the records based on the grouping within the at least one first matchcode equivalence cluster.

18. The system of claim 17, wherein at least one of the essential substrings includes a middle name substring, a generational substring, or a title substring.

19. The system of claim 17, wherein each of the first matchcodes and each of the second matchcodes is generated based on matchcode generation rules.

20. The system of claim 19, wherein the matchcode generation rules include a sensitivity level.

21. The system of claim 20, wherein a sensitivity level controls an amount of record transformation involved in generating matchcodes.

22. The system of claim 17, wherein, for one of the first records, forming the second matchcode includes:
applying a context-specific transformation to the essential substring contained in the respective essential field.

23. The system of claim 17, wherein each of the essential substrings includes a first name, and wherein the operations further include:
with respect to at least one of the records:
retrieving an alternate spelling of the first name included in the respective essential substring.

24. The system of claim 23, wherein:
the alternate spelling is retrieved from a table that includes names that are individually indexed to alternate spellings.

25. The system of claim 24, wherein identifying matches amongst the records includes:
determining that the second matchcode for one of the first records is equivalent to the second matchcode for another one of the first records, wherein determining includes:
determining that the second fuzzy representation of the essential substring included in the one of the first records is equivalent to the second fuzzy representation of the essential substring included in the another of the first records; and
determining that the following are equivalent:
the nonessential field matchcode segment that represents the nonessential substring included in the one of the first records; and
the nonessential field matchcode segment that represents the nonessential substring included in the another one of the first records.

26. The system of claim 17, wherein identifying matches amongst the records includes:
determining that the second matchcode for one of the first records is equivalent to the second matchcode for one of the second records, wherein determining includes:
determining that the second fuzzy representation of the essential substring included in the one of the first records is equivalent to the second fuzzy representation of the essential substring included in the one of the second records; and
determining that the matchcode for the one of the second records includes a wildcard character.

27. The system of claim 17, wherein the operations further include:
within each of the first matchcode equivalence clusters, further grouping at least one of the records with at least one of the other records;
evaluating each of the groupings of the records within first matchcode equivalence clusters, wherein evaluating includes:
providing a first score component to each of the groupings that includes exclusively first records;
providing a second score component to each of the groupings that includes one of the first records and one of the second records, wherein the second score component is lower than the first score component; and
providing a third score component to each of the groupings that includes exclusively second records, wherein the third score component is lower than the second score component.

28. The system of claim 27, wherein identifying matches amongst the records is such that:
each of the identified matches is between records in one of the evaluated groupings; and
for each of the records, being grouped with any other of the records is a condition precedent for being identified as matching that record.

29. The system of claim 28, wherein the phonetic reduction includes all original consonants from the respective substring and does not include any vowels.

30. A computer-program product tangibly embodied in a non-transitory computer-readable medium, the medium having instructions stored thereon, and the instructions operable to cause a data processing apparatus to perform operations including:
accessing records, wherein:
the records include first records and second records;
each of the records includes a respective essential field and a respective nonessential field, and wherein:
in each of the first records and in each of the second records, the respective essential field includes an essential substring;
in each of the first records, the respective nonessential field includes a nonessential substring; and
in each of the second records, the respective nonessential field is empty;
for each of the records, deriving:
a first matchcode that includes a first fuzzy representation of the respective essential substring; and
a second matchcode that includes a second fuzzy representation of the respective essential substring, wherein the second fuzzy representation is different than the first fuzzy representation, and wherein:
each of the second matchcodes derived for a first record includes a nonessential field matchcode segment that represents the respective nonessential substring; and
each of the second matchcodes derived for a second record includes a wildcard character segment that is deemed to be equivalent to each of the nonessential field matchcode segments;
forming first matchcode equivalence clusters by selectively grouping the records such that first matchcodes for records grouped together are equivalent, wherein forming the first matchcode equivalence clusters is done independently of record type;
within at least one of the first matchcode equivalence clusters, further grouping at least one of the records with at least one of the other records, wherein grouping within each of the at least one first matchcode equivalence clusters:
is done such that second matchcodes for records grouped together are equivalent; and
is done independently of similarities between records in different first matchcode equivalence clusters; and
identifying matches amongst the records based on the grouping within the at least one first matchcode equivalence cluster.

31. The computer-program product of claim 30, wherein at least one of the essential substrings includes a middle name substring, a generational substring, or a title substring.

32. The computer-program product of claim 30, wherein each of the first matchcodes and each of the second matchcodes is generated based on matchcode generation rules.

33. The computer-program product of claim 32, wherein the matchcode generation rules include a sensitivity level.

34. The computer-program product of claim 33, wherein a sensitivity level controls an amount of record transformation involved in generating matchcodes.

35. The computer-program product of claim 30, wherein, for one of the first records, forming the second matchcode includes:
   applying a context-specific transformation to the essential substring contained in the respective essential field.

36. The computer-program product of claim 30, wherein each of the essential substrings includes a first name, and wherein the operations further include:
   with respect to at least one of the records:
      retrieving an alternate spelling of the first name included in the respective essential substring.

37. The computer-program product of claim 36, wherein:
   the alternate spelling is retrieved from a table that includes names that are individually indexed to alternate spellings.

38. The computer-program product of claim 37, wherein identifying matches amongst the records includes:
   determining that the second matchcode for one of the first records is equivalent to the second matchcode for another one of the first records, wherein determining includes:
      determining that the second fuzzy representation of the essential substring included in the one of the first records is equivalent to the second fuzzy representation of the essential substring included in the another of the first records; and
      determining that the following are equivalent:
         the nonessential field matchcode segment that represents the nonessential substring included in the one of the first records; and
         the nonessential field matchcode segment that represents the nonessential substring included in the another one of the first records.

39. The computer-program product of claim 30, wherein identifying matches amongst the records includes:
   determining that the second matchcode for one of the first records is equivalent to the second matchcode for one of the second records, wherein determining includes:
      determining that the second fuzzy representation of the essential substring included in the one of the first records is equivalent to the second fuzzy representation of the essential substring included in the one of the second records; and
      determining that the matchcode for the one of the second records includes a wildcard character.

40. The computer-program product of claim 30, wherein the operations further include:
   within each of the first matchcode equivalence clusters, further grouping at least one of the records with at least one of the other records;
   evaluating each of the groupings of the records within first matchcode equivalence clusters, wherein evaluating includes:
      providing a first score component to each of the groupings that includes exclusively first records;
      providing a second score component to each of the groupings that includes one of the first records and one of the second records, wherein the second score component is lower than the first score component; and
      providing a third score component to each of the groupings that includes exclusively second records, wherein the third score component is lower than the second score component.

41. The computer-program product of claim 40, wherein identifying matches amongst the records is such that:
   each of the identified matches is between records in one of the evaluated groupings; and
   for each of the records, being grouped with any other of the records is a condition precedent for being identified as matching that record.

* * * * *